US009366904B2

(12) United States Patent
Li (10) Patent No.: US 9,366,904 B2
(45) Date of Patent: Jun. 14, 2016

(54) LIQUID CRYSTAL DISPLAY PANEL WITH MULTI-DOMAIN HORIZONTALLY ALIGNED LIQUID CRYSTAL LAYER AND MANUFACTURE METHOD THEREOF AND LIQUID CRYSTAL DISPLAY DEVICE

(71) Applicant: BOE TECHNOLOGY GROUP CO., LTD., Beijing (CN)

(72) Inventor: Mingchao Li, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 14/380,177

(22) PCT Filed: Nov. 29, 2013

(86) PCT No.: PCT/CN2013/088097

§ 371 (c)(1),
(2) Date: Aug. 21, 2014

(87) PCT Pub. No.: WO2014/206002

PCT Pub. Date: Dec. 31, 2014

(65) Prior Publication Data

US 2015/0323820 A1     Nov. 12, 2015

(30) Foreign Application Priority Data

Jun. 28, 2013   (CN) .......................... 2013 1 0269369

(51) Int. Cl.
*H01L 21/00*     (2006.01)
*G02F 1/1337*     (2006.01)
(Continued)

(52) U.S. Cl.
CPC ............ *G02F 1/1337* (2013.01); *G02F 1/1334* (2013.01); *G02F 1/1341* (2013.01);
(Continued)

(58) Field of Classification Search
CPC ................ G02F 1/1337; G02F 1/1334; G02F 1/133514; G02F 1/133528; G02F 1/133711; G02F 1/133753; G02F 1/1341
See application file for complete search history.

(56) References Cited

U.S. PATENT DOCUMENTS

| 8,149,363 B2 | 4/2012 | Hashimoto et al. |
| 2006/0103804 A1 | 5/2006 | Hirosawa |
| 2013/0050624 A1 | 2/2013 | Kim |

FOREIGN PATENT DOCUMENTS

| CN | 101802693 A | 8/2010 |
| CN | 101805618 A | 8/2010 |
| CN | 102629012 A | 8/2012 |
| CN | 102955294 A | 3/2013 |
| CN | 102985872 A | 3/2013 |
| CN | 103353690 A | 10/2013 |

OTHER PUBLICATIONS

English Translation of the International Search Report of PCT/CN2013/088097 published in English on Dec. 31, 2015. International Search Report, International Preliminary Report on Patentability and Written Opinion of the International Searching Authority of PCT/CN2013/088097 in Chinese, mailed Mar. 27, 2014.

(Continued)

*Primary Examiner* — Tracie Y Green
(74) *Attorney, Agent, or Firm* — Collard & Roe, P.C.

(57) ABSTRACT

A liquid crystal display panel and manufacture method thereof and a liquid crystal display device are provided. The liquid crystal display panel comprises an array substrate (1); a color filter substrate (2); and a liquid crystal cell (3) formed by assembling the array substrate (1) and the color filter substrate (2). The liquid crystal cell (3) is filled with liquid crystal. A multi-domain horizontally aligned liquid crystal layer (4) including a the polymerable liquid crystal mixture is provided on the array substrate (1), and liquid crystal molecules of the multi-domain horizontally aligned liquid crystal layer are horizontally aligned in multi domains on a plane of the array substrate (1) according to domain directions of electrodes on the array substrate (1). Since the multi-domain alignment is achieved by a single alignment process, the process is simple and the display quality can be improved by using this mix alignment technique.

17 Claims, 11 Drawing Sheets

(51) Int. Cl.
 *G02F 1/1335* (2006.01)
 *G02F 1/1334* (2006.01)
 *G02F 1/1341* (2006.01)

(52) U.S. Cl.
 CPC .... *G02F1/133514* (2013.01); *G02F 1/133528* (2013.01); *G02F 1/133711* (2013.01); *G02F 1/133753* (2013.01); *G02F 2001/133738* (2013.01); *G02F 2001/133742* (2013.01); *G02F 2001/133757* (2013.01)

(56) References Cited

OTHER PUBLICATIONS

Chinese Office Action of Chinese Application No. 201310269369.8, mailed Apr. 3, 2015 with English translation.

English translation of the International Preliminary Report on Patentability and Written Opinion of the International Searching Authority of PCT/CN2013/088097, issued Dec. 29, 2015.

LIQUID CRYSTAL DISPLAY PANEL WITH MULTI-DOMAIN HORIZONTALLY ALIGNED LIQUID CRYSTAL LAYER AND MANUFACTURE METHOD THEREOF AND LIQUID CRYSTAL DISPLAY DEVICE

CROSS REFERENCE TO RELATED APPLICATIONS

This application is the National Stage of PCT/CN2013/088097 filed on Nov. 29, 2013, which claims priority under 35 U.S.C. §119 of Chinese Application No. 201310269369.8 filed on Jun. 28, 2013, the disclosure of which is incorporated by reference.

TECHNICAL FIELD

Embodiments of the present invention relate to a liquid crystal display panel and a manufacture method thereof and a liquid crystal display device.

BACKGROUND

With the advancement of the technology, there is an increasingly demand on the liquid crystal display effect. Advanced Super Dimension Switch (ADS) multi-domain mode display technology can improve image quality, and has advantages, such as high transmittance, wide viewing angle, high aperture ratio or the like, so it is used widely.

When a conventional ADS multi-domain mode is used to achieve multi-domain alignment, an alignment film is usually coated on an array substrate and a color filter substrate, and the rubbing method is used to achieve multi-domain alignment. When the rubbing process is used to achieve multi-domain alignment, the coated alignment film is made rubbing processing, liquid crystal molecules of the alignment film are correspondingly aligned by aligning the alignment film along the rubbing direction, but the alignment of the alignment film on the same rubbing direction would cause some liquid crystal molecules to allow the light from the backlight passing through, which results in light leakage on dark state. Therefore, a plurality of rubbing processes are needed to be performed on different rubbing directions. Therefore, it is complicated to perform a plurality of rubbing processes to achieve the multi-domain alignment of the ADS multi-domain mode, and the plurality of rubbing processes would easily result in bad processing and the display quality is decreased.

SUMMARY

Embodiments of the invention provide a liquid crystal display panel and a manufacture method thereof and a liquid crystal display device including the liquid crystal display panel.

According to an aspect of the present invention, a liquid crystal display panel is provided, which comprises an array substrate, a color filter substrate and a liquid crystal cell formed by assembling the array substrate and the color filter substrate. The liquid crystal cell is filled with liquid crystal. An electrode structure with multi-domain alignment is provided on the array substrate, and the array substrate comprises a multi-domain horizontally aligned liquid crystal layer containing a the polymerable liquid crystal mixture arranged on a side facing the color filter substrate; liquid crystal molecules of the multi-domain horizontally aligned liquid crystal layer are aligned horizontally in multi-domain on a plane of the array substrate according to domain directions of electrodes included in the electrode structure on the array substrate.

According to another aspect of the present invention, a method of manufacturing a liquid crystal display panel is provided, which comprises: preparing an array substrate having a multi-domain alignment electrode structure; preparing a color filter substrate; dispersedly disposing a polymerable liquid crystal mixture in an inner side of the array substrate; applying a voltage on the array substrate so that liquid crystal molecules of the polymerable liquid crystal mixture are horizontally aligned in multi domains on the plane of the array substrate according to a domain direction of the electrode under an effect of an electrical field; curing the polymerable liquid crystal mixture with liquid crystal molecules being horizontally aligned in multi domains so as to form a multi-domain horizontally aligned liquid crystal layer containing a the polymerable liquid crystal mixture; and assembling the color filter substrate and the array substrate having multi-domain horizontally aligned liquid crystal layer and filling liquid crystal into it so as to form a liquid crystal display panel.

According to yet another aspect of the present invention, a liquid display device is provided, which comprises the liquid crystal display panel.

DETAILED DESCRIPTION

Technical solutions according to the embodiments of the present invention will be described clearly and completely as below in conjunction with the accompanying drawings of embodiments of the present invention. It is apparent that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Embodiment 1

Figure 1:
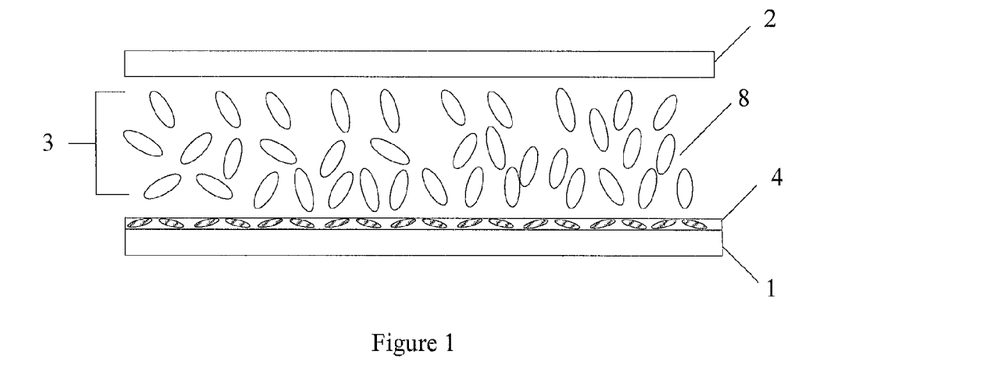
FIG. 1 is a structural schematic view of a liquid crystal display panel according to an embodiment of the present invention.

The embodiment 1 of the present invention provides a liquid crystal display panel. The liquid crystal display panel comprises an array substrate 1, a color filter substrate 2, a liquid crystal cell 3 formed by assembling the array substrate 1 and the color filter substrate 2, and liquid crystal filled in the liquid crystal cell 3. According to the embodiment of the present invention, the array substrate 1 comprises a multi-domain horizontally aligned liquid crystal layer 4 arranged on a side facing the color filter substrate 2, as shown in FIG. 1.

Figure 2A:
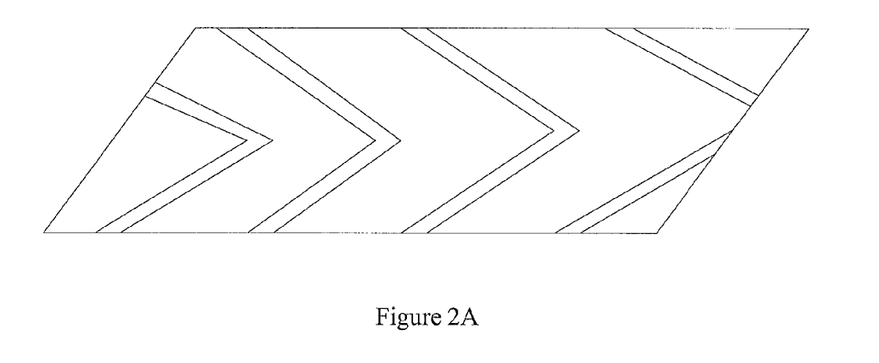
FIG. 2A is a top schematic view of an array substrate having a multi-domain alignment electrode structure according to an embodiment of the present invention.

For example, in the embodiment of the present invention, the array substrate 1 comprises a multi-domain alignment electrode structure; FIG. 2 shows a top view of the array substrate having the multi-domain alignment electrode structure.

Figure 2B:
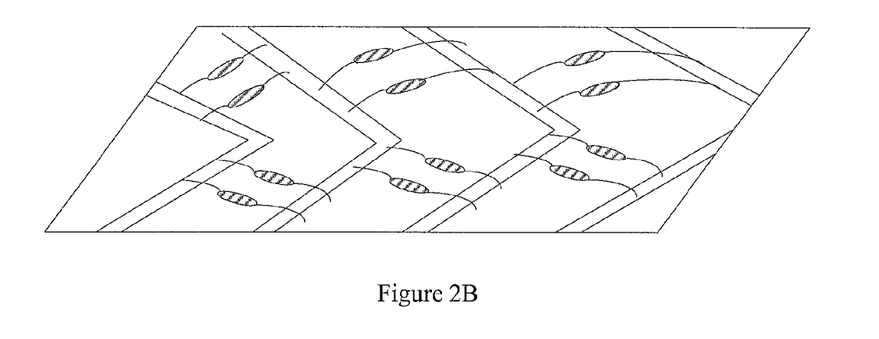
FIG. 2B is a top schematic view of an array substrate having a multi-domain horizontally aligned liquid crystal layer according to an embodiment of the present invention.

Additionally, according to the embodiment of the present invention, the array substrate 1 comprises a multi-domain horizontally aligned liquid crystal layer 4 arranged on an inner side, that is, the side of the array substrate 1 faces the color filter substrate 2. The multi-domain horizontally aligned liquid crystal layer 4 comprises a the polymerable liquid crystal mixture, liquid crystal molecules 8 in the polymerable liquid crystal mixture can be arranged along an electric field direction under the effect of the electrical field. Therefore, in the embodiment of the present invention, a voltage V is applied to the multi-domain alignment electrode structure so that the liquid crystal molecules 8 in the polymerable liquid crystal mixture are aligned horizontally in multi-domain on the plane of the array substrate 1 according to domain directions of electrodes in the electrode structure on the array substrate 1; that is, the liquid crystal molecules 8 in the polymerable liquid crystal mixture form multi-domain alignments by a single alignment process. FIG. 2B shows a top view of the array substrate having a multi-domain horizontally aligned liquid crystal layer 4.

Additionally, according to the embodiment of the present invention, the polymerable liquid crystal mixture comprises polymerable liquid crystal molecules and reactive groups (RM groups). For example, the ratio of the polymerable liquid crystal molecules to the RM groups is (90±5)%: (10±5)% (mass percent), other ratios can be selected, and the present invention is not limited thereto.

The polymerable liquid crystal molecules can be arranged along the electric field direction under the effect of the electrical field. According to the embodiment of the present invention, a polymerable liquid crystal mixture is used as a material for forming a multi-domain horizontally aligned liquid crystal layer. A multi-domain alignment electrode structure is formed on the array substrate. Therefore, when the array substrate is applied with a voltage and powered up, the randomly oriented polymerable liquid crystal molecules are aligned horizontally in multi-domain according to domain directions of the multi-domain electrodes. It is simple and operable to achieve multi-domain alignments of the liquid crystal molecules 8 by a single alignment process.

According to the embodiment of the present invention, a liquid crystal display panel is provided. A multi-domain horizontally aligned liquid crystal layer containing a the polymerable liquid crystal mixture is arranged on the array substrate. The liquid crystal molecules 8 of the multi-domain horizontally aligned liquid crystal layer can be aligned in multi-domain according to domain directions of the multi-domain electrodes on the array substrate under the effect of the electrical field. The multi-domain alignment can be achieved by a single alignment process, and the process is simple and operable.

Embodiment 2

A transparent display device in the ADS multi-domain mode needs to achieve a transparent state and an opaque state of the liquid crystal cell. The embodiment 2 will be described in detail to explain the liquid crystal display panel having a multi-domain horizontally aligned liquid crystal layer formed by a single alignment process which is referred in embodiment 1 to achieve the transparent state and the opaque state of the transparent display device.

Figure 3A:
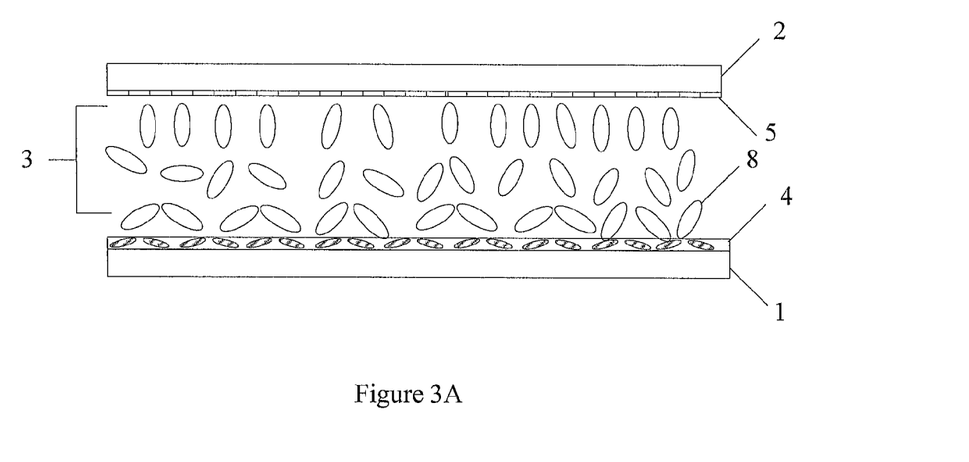
FIG. 3A is a schematic view of a liquid crystal display panel when a liquid crystal cell in a transparent display device having mixed alignments is in an opaque state according to a second embodiment of the present invention.

As shown in FIG. 3A, a liquid crystal display panel provided by the embodiment 2 of the present invention comprises: an array substrate 1, a color filter substrate 2, a multi-domain horizontally aligned liquid crystal layer 4 arranged on a side of the array substrate 1 facing the color filter substrate 2, an alignment film 5 with a vertical alignment arranged on a side of the color filter substrate 2 facing the array substrate 1, and a liquid crystal cell 3 formed by assembling the array substrate 1 and the color filter substrate 2, wherein the liquid crystal cell is filled with a liquid crystal molecules 8, and the vertical alignment means that the alignment direction is vertical to the plane where the color filter substrate 2 is located.

According to the embodiment, the vertically aligned alignment film 5 is disposed on an inner side of the color filter substrate 2, that is, the side of the color filter substrate 2 facing the array substrate 1. The multi-domain horizontally aligned liquid crystal layer 4 is disposed on an inner side of the array substrate 1. When the electrodes of the array substrate are not applied with a voltage (that is, are not powered on), the liquid crystal molecules in the liquid crystal cell 3 formed by assembling the array substrate 1 and the color filter substrate 2 will be aligned according to the alignment direction of the alignment film 5 on an inner side of the color filter substrate 2 and the alignment direction of the liquid crystal molecules 8 in the multi-domain horizontally aligned liquid crystal layer 4 on the inner side of the array substrate 1. The alignment film 5 on the inner side of the color filter substrate 2 has a vertical alignment so that the liquid crystal molecules 8 near to the alignment film 5 in the liquid crystal cell 3 have a vertical alignment. The liquid crystal molecules in the multi-domain horizontally aligned liquid crystal layer 4 on the side of the array substrate 1 has a multi-domain horizontal alignment so that the liquid crystal molecules 8 near to the array substrate 1 in the liquid crystal cell 3 have a multi-domain horizontal alignment; that is, the liquid crystal molecules in the liquid crystal cell have hybrid alignments; therefore the light cannot pass through the liquid crystal cell, and the liquid crystal cell is in an opaque state. When there is no external power supply, the liquid crystal molecules in the liquid crystal cell have hybrid alignments which allow the liquid crystal cell in the opaque state, referring to FIG. 1 again. According to the embodiment of the present invention, the liquid crystal molecules 8 near to the array substrate in the liquid crystal cell are horizontally aligned in multi domains and the liquid crystal molecules near to the color filter substrate in the liquid crystal cell are vertically aligned in multi-domain, so that the liquid crystal molecules in the liquid crystal cell are hybrid aligned, therefore the hybrid aligned liquid crystal molecules do not permit light from the backlight to pass through the liquid crystal cell, so as to achieve an opaque state of the transparent display device. Since the liquid crystal molecules of the side near to the color film has a vertical alignment and the liquid crystal molecules of the side near to the array substrate has a horizontal alignment so that the luminance is very low in the dark state to achieve relative high contrast and an improved display quality.

Figure 3B:
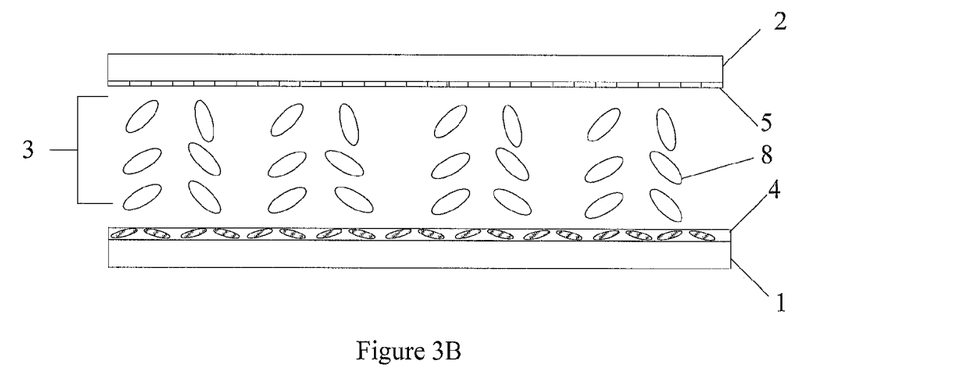
FIG. 3B is a schematic view of a liquid crystal display panel when the liquid crystal cell in the transparent display device having mixed alignments is in a transparent state according to a second embodiment of the present invention.

In the present embodiment, an alignment film 5 having a vertical alignment is arranged on the inner side of the color filter substrate 2, that is, the side of the color filter substrate 2 facing the array substrate 1, while a multi-domain horizontally aligned liquid crystal layer is disposed on the inner side of the array substrate 1; when the electrodes of the array substrate are applied with a voltage, (that is, is powered on), the liquid crystal molecules 8 in the liquid crystal cell will be aligned according to the direction of the electrical field under the effect of the electrical field, rather than be aligned in hybrid alignments comprising vertical alignment and horizontal alignment, so that the light can pass through the liquid crystal cell and the liquid crystal cell presents a transparent state. That is, the liquid crystal molecules 8 in the liquid crystal cell have alignments which allow the liquid crystal cell in a transparent state when it is applied with an external voltage.

Additionally, as shown in FIG. 3B, according to the present embodiment, the multi-domain horizontally aligned liquid crystal layer comprises polymerable liquid crystal molecules and reactive groups so that there are large polarity forces among the liquid crystal molecules in the liquid crystal cell and polymerable liquid crystal molecules and the reactive groups in the multi-domain horizontally aligned liquid crystal layer, thereby anchorage forces applied to the liquid crystal molecules in the surface by the multi-domain horizontally aligned liquid crystal layer are increased. When an external voltage is applied and the transparent display device achieves the transparent state, the liquid crystal molecules in the liquid crystal cell are subjected to the strong anchorage forces applied by the multi-domain horizontally aligned liquid crystal layer of the array substrate besides the electrical force so that the liquid crystal molecules in the liquid crystal cell are aligned along the direction of electrical field and can also be distributed in multi-domain along the multi-domain horizontal direction of the liquid crystal molecules in the multi-domain horizontally aligned liquid crystal layer on the array substrate, therefore the characteristic of multi-views of the transparent display device is strengthened.

In the present embodiment, the multi-domain alignment are performed to the array substrate by using the polymerable liquid crystal mixture including RM groups and the polymerable liquid crystal molecules, so that the multi-domain alignment can be achieved by a single alignment process, and the process is simple. While the multi-domain aligned liquid crystal layer is arranged on the array substrate, an alignment film having a vertical alignment is disposed on the inner side of the color filter substrate, that is, a hybrid alignment technology is used to achieve a transparent state and an opaque state of the transparent display device in the multi-domain mode, therefore better display quality can be achieved without using a polarizer.

Embodiment 3

The embodiment 3 of the present invention provides a liquid crystal display panel having a multi-domain horizontally aligned liquid crystal layer formed by a single alignment process which is referred in another embodiment to achieve the transparent state and the opaque state of the transparent display device.

The liquid crystal display panel provided in the embodiment 3 comprises: an array substrate 1, a color filter substrate 2, a multi-domain horizontally aligned liquid crystal layer 4 disposed respectively on a side of the array substrate 1 facing the color filter substrate 2 and a side of the color filter substrate 2 facing the array substrate 1, and a liquid crystal cell 3 formed by assembling the array substrate 1 and the color filter substrate 2, wherein the liquid crystal cell 3 is filled with liquid crystal.

Figure 3C:
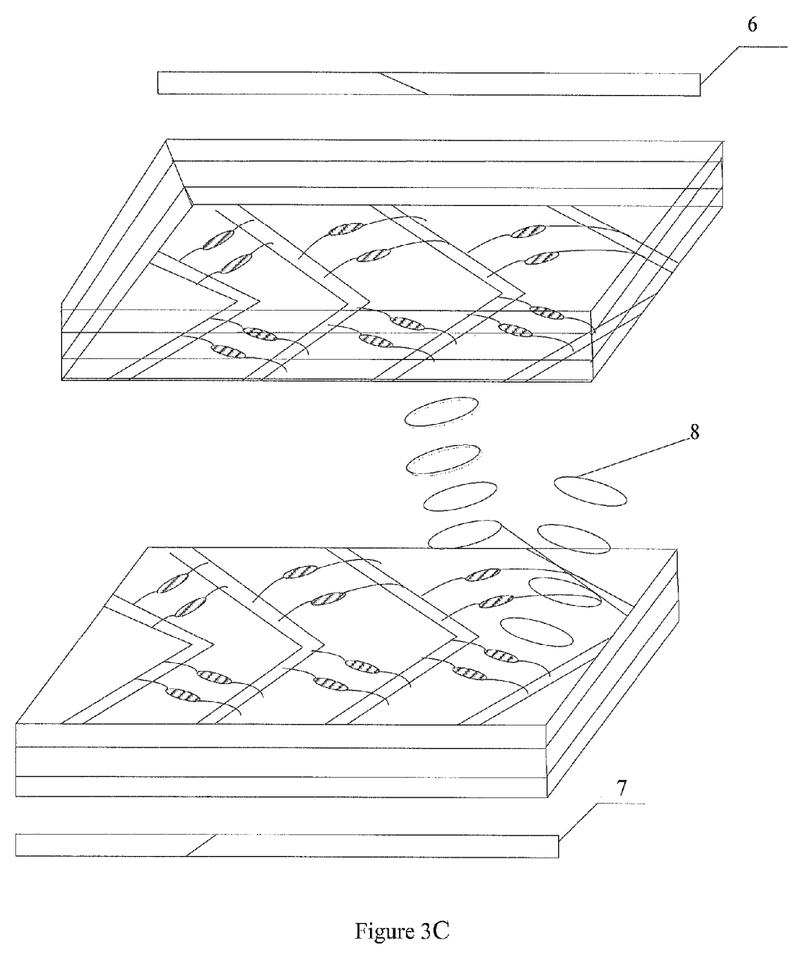
FIG. 3C is a schematic view of liquid crystal molecules alignments when the liquid crystal cell in the transparent display device having a polarizer is in an opaque state according to a third embodiment of the present invention.
Figure 3D:
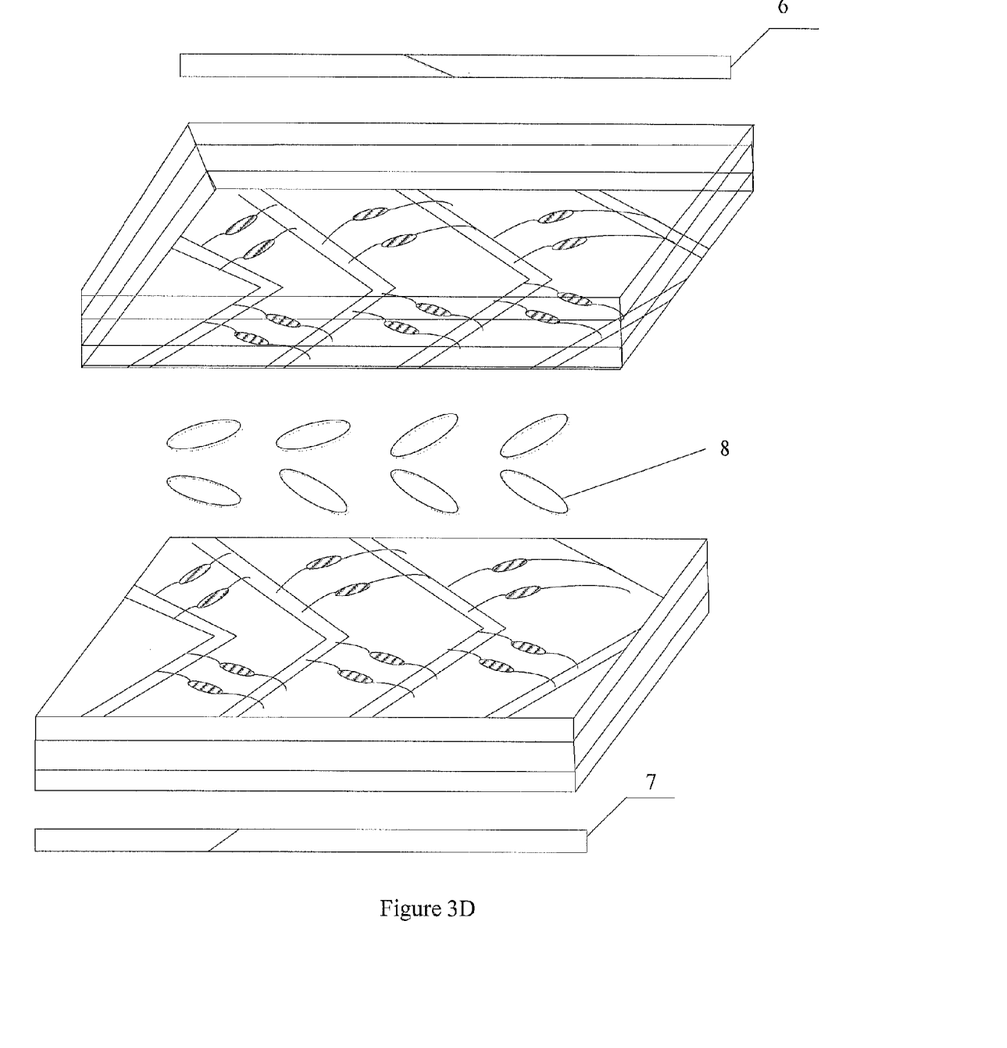
FIG. 3D is a schematic view of liquid crystal molecules alignments when the liquid crystal cell in the transparent display device having a polarizer is in a transparent state according to a third embodiment of the present invention.

For example, for achieving the transparent state and the opaque state of the transparent display device, a first polarizer 6 and a second polarizer 7 are respectively disposed on the sides of the array substrate 1 and the color filter substrate 2 facing away the liquid crystal cell, and the polarization direction of the first polarizer 6 is vertical to that of the second polarizer 7. When there is no external voltage, although the liquid crystal molecules near to the color filter substrate have the same alignments with the liquid crystal molecules 8 near to the array substrate, since the polarization direction of the first polarizer 6 is vertical to that of the second polarizer 7, the light cannot pass through the liquid crystal cell 3, either, thus the liquid crystal cell 3 is in an opaque state, as shown in FIG. 3C. When there is an external voltage, although the liquid crystal molecules 8 in the surface of the multi-domain horizontally aligned liquid crystal layer remain original state due to the anchorage force, most of liquid crystal molecules 8 in the liquid crystal cell 3 would be arranged along the electrical field to deflect the liquid crystal molecules 8, and the deflected liquid crystal molecules 8 have an angle with a polarization axis to permit the light to pass through the polarizer, therefore the light can pass through the liquid crystal cell 3 so that the transparent display device is in a transparent state. For increasing the transmittance, the first polarizer and the second polarizer can be rotated so that the liquid crystal molecules achieve the required transmittance, which is flexible to operate, as shown in FIG. 3D.

According to the transparent display panel provided in the embodiment 3, a multi-domain horizontally aligned liquid crystal layer 4 is disposed both on the color filter substrate 2 and the array substrate 1 without an alignment film additionally disposed, and the transparent state and the opaque state of the transparent display device are achieved by a single alignment process, and the manufacturing process can be simplified.

Embodiment 4

Figure 4:
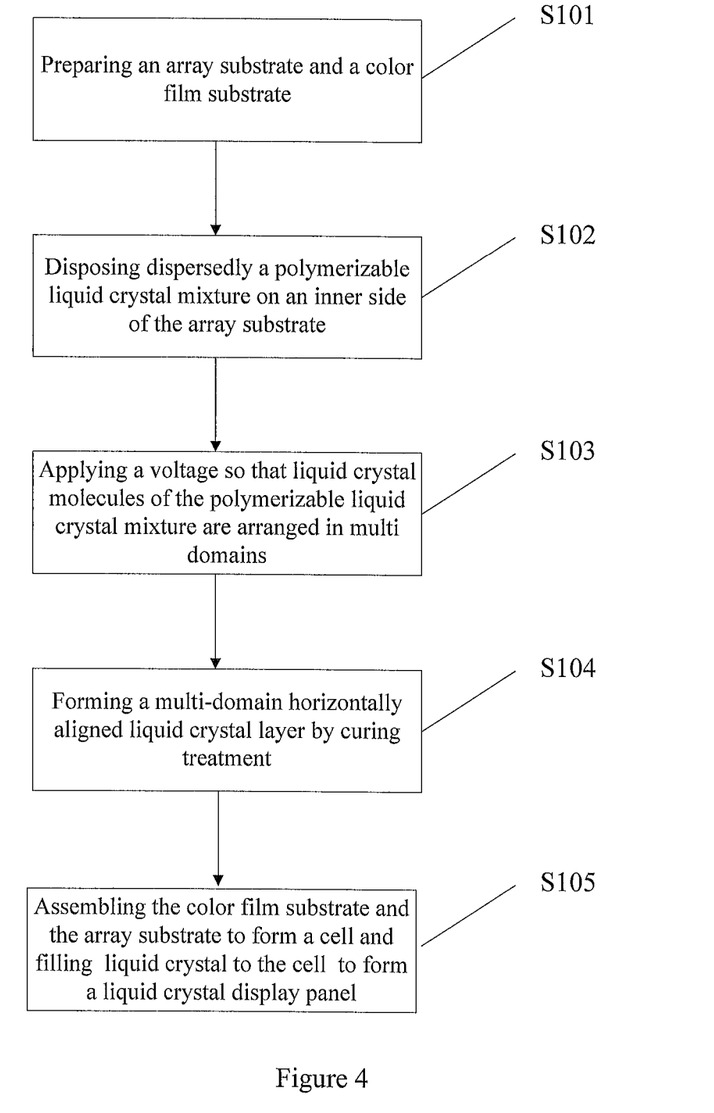
FIG. 4 is a flowchart of a method of manufacturing the liquid crystal display panel according to an embodiment of the present invention.

The embodiment 4 of the present invention provides a method of manufacturing a liquid crystal display panel, as shown in FIG. 4, the method comprises following steps.

S101: an array substrate and a color filter substrate are prepared.

Figure 5A:
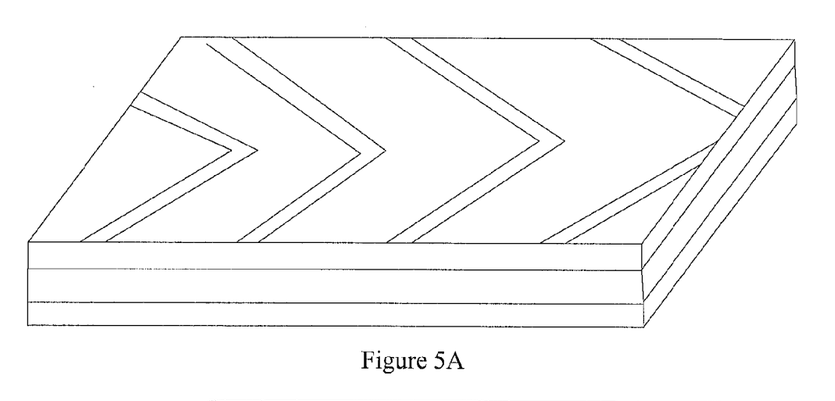
FIGS. 5A-5E are schematic views of the structures formed in the procedure of manufacturing the liquid crystal display panel according to embodiments of the present invention.

The array substrate in the embodiment of the present invention can be manufactured by a conventional manufacturing process. Various array substrates can be manufactured, but the manufactured array substrates need to comprise a multi-domain alignment electrode structure. For example, it can be an ADS multi-domain mode array substrate. FIG. 5A shows a schematic view of the structure of the ADS multi-domain mode array substrate according to the embodiment of the present invention.

The array substrate having a multi-domain alignments electrode structure manufactured by a complete process are cleansed for later use.

The color filter substrate in the embodiment of the present invention can also be manufactured by a conventional manufacturing process.

S102: A polymerable liquid crystal mixture is dispersedly disposed on an inner side of the array substrate manufactured in S101.

In the embodiment of the present invention, the polymerable liquid crystal mixture can be formed on the inner side of the array substrate by coating, transferring or spinning process or the like, the present invention is not limited thereto.

Figure 5B:
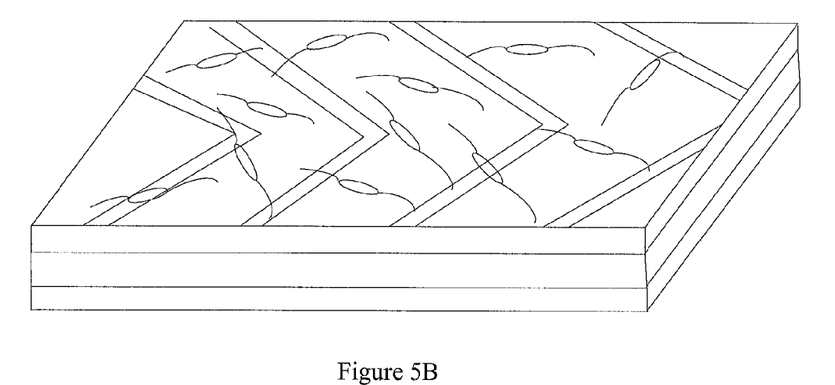

In the polymerable liquid crystal mixture formed on the inner side of the array substrate according to the embodiment of the present invention, the polymerable liquid crystal molecules can be freely arranged on the array substrate having a multi-domain alignment electrode structure without the effect of the electrical field, as shown in FIG. 5B.

The polymerable liquid crystal mixture according to the embodiment of the present invention can be, for example, a mixture of polymerable liquid crystal molecules and reactive groups, wherein the electron withdrawing groups are groups having large electronegativity, for example, —CN, —X (X is a halogen element) or the like. The ratio of the polymerable liquid crystal molecules to the reactive groups is controlled to be (90±5)%: (10±5)% (mass percent). The polymerable liquid crystal mixture including the polymerable liquid crystal molecules and the reactive groups is dispersedly arranged.

In the embodiment of the present invention, the polymerable liquid crystal mixture can also be consisted of liquid crystal monomers including the polymerable functional groups.

S103: A voltage is applied to the array substrate of S102 so that the liquid crystal molecules of the polymerable liquid crystal mixture are arranged in multi-domain.

Figure 5C:
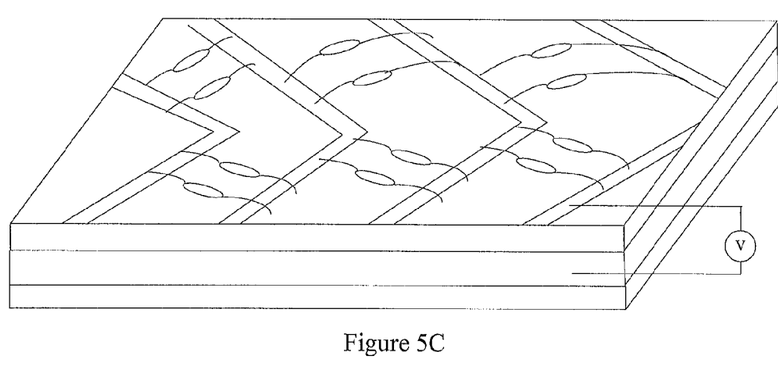

In the embodiment of the present invention, after the array substrate is connected to an external power supply, that is, applied with an external voltage, since the electrodes of the array substrate have multi-domain directions, corresponding directions of electrical fields are created, so that the polymerable liquid crystal molecules randomly oriented initially on the array substrate are aligned in multi-domain according to the directions of the electrical fields, as shown in FIG. 5C.

S104: the array substrate subjected to the step S103 are cured to form a multi-domain horizontally aligned liquid crystal layer including a polymerable liquid crystal mixture.

Figure 5D:
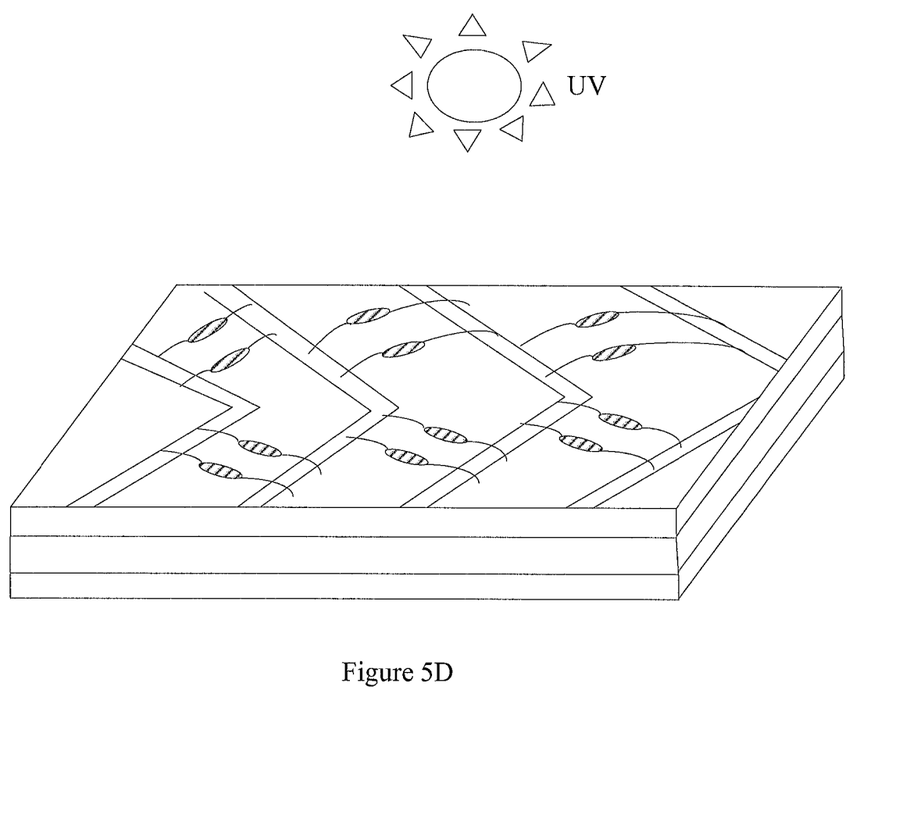

In the embodiment of the present embodiment, when the array substrate is cured, the curing wavelength is identical with the polymerization wavelength of the polymerable liquid crystal mixture. The polymerization wavelength of the polymerable liquid crystal mixture is generally within an ultraviolet region, for example, about 360 nm. The polymerization wavelength of the present embodiment is 360 nm, for example. The polymerization energy is 1 mw/cm$^2$, for example. The polymerization time is 1 hour, for example. The multi-domain horizontally aligned liquid crystal layer is formed after the curing, as shown in FIG. 5D.

Figure 5E:
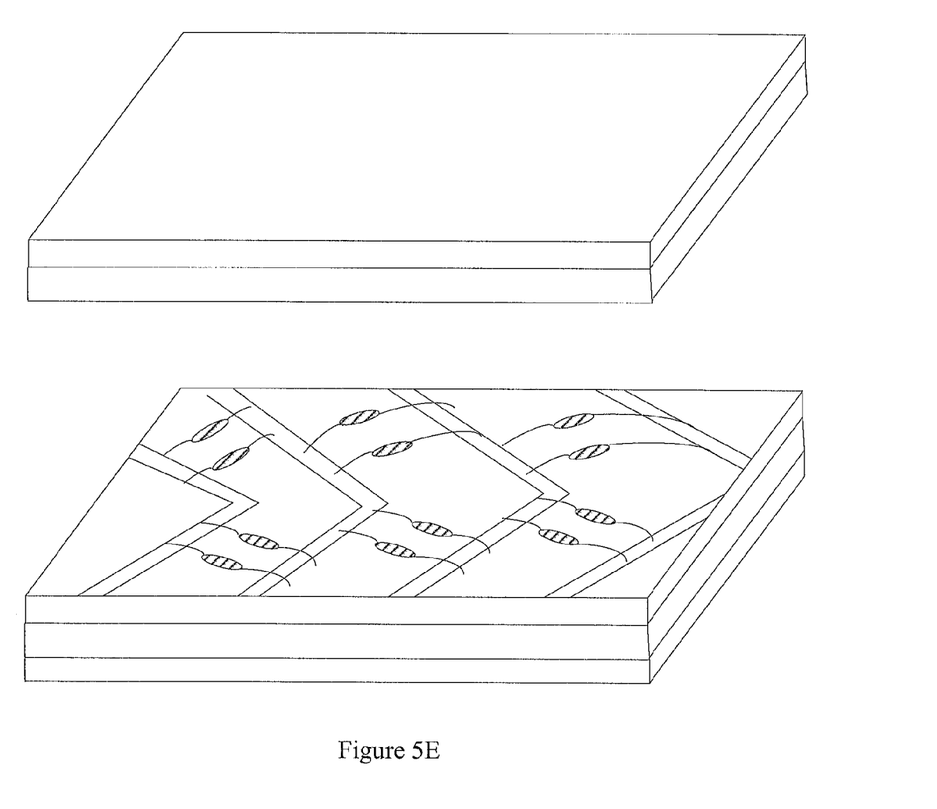

S105: the color filter substrate and the array substrate having multi-domain horizontally aligned liquid crystal layer are assembled to form a liquid crystal cell and liquid crystal is filled to the cell so as to form a liquid crystal display panel, as shown in FIG. 5E.

Figure 6:
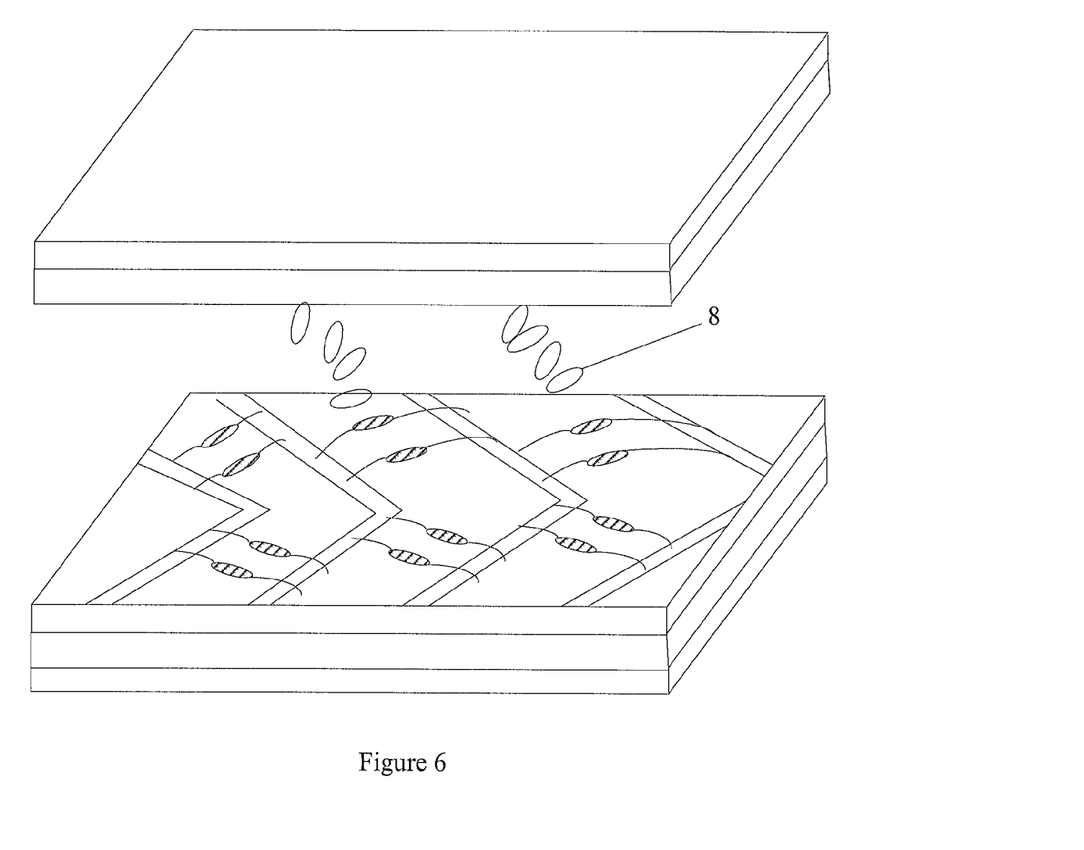
FIG. 6 is a schematic view of the liquid crystal molecules distribution when the liquid crystal display panel is in an opaque state according to an embodiment of the present invention.
Figure 7:
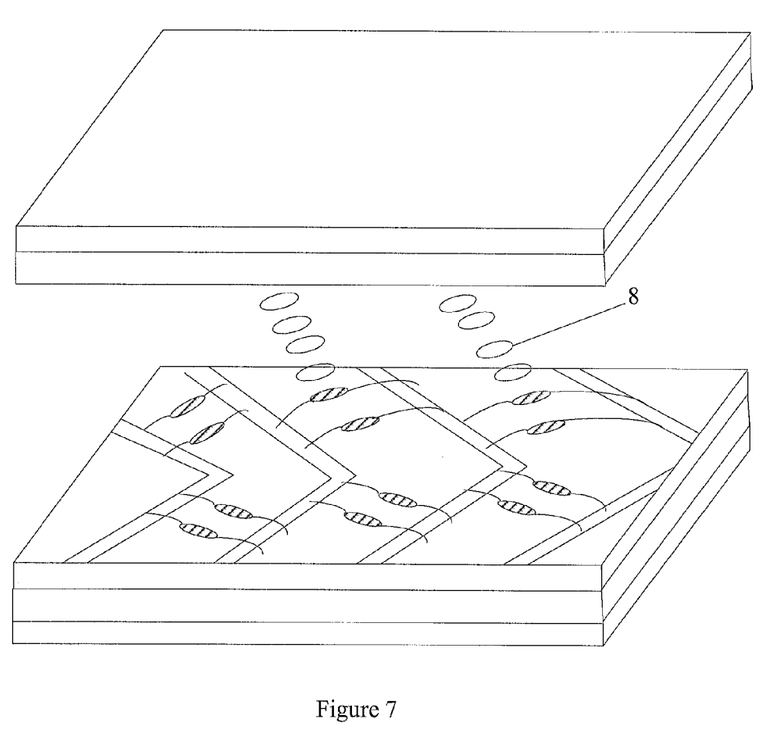
FIG. 7 is a schematic view of the liquid crystal molecules distribution when the liquid crystal display panel is in a transparent state according to an embodiment of the present invention.

Further, the liquid crystal display panel as shown in FIG. 5E according to the embodiment of the present invention, when the liquid crystal display panel is not applied with a voltage, the light cannot pass through the liquid crystal cell 3, that is, the liquid crystal cell 3 is in an opaque state, as shown in FIG. 6. When it is applied with a voltage, the liquid crystal molecules in the liquid crystal cell 3 are arranged under the effect of the electrical field so that the light can pass through the liquid crystal cell 3, and the liquid crystal cell 3 is in a transparent state, as shown in FIG. 7.

Figure 8:
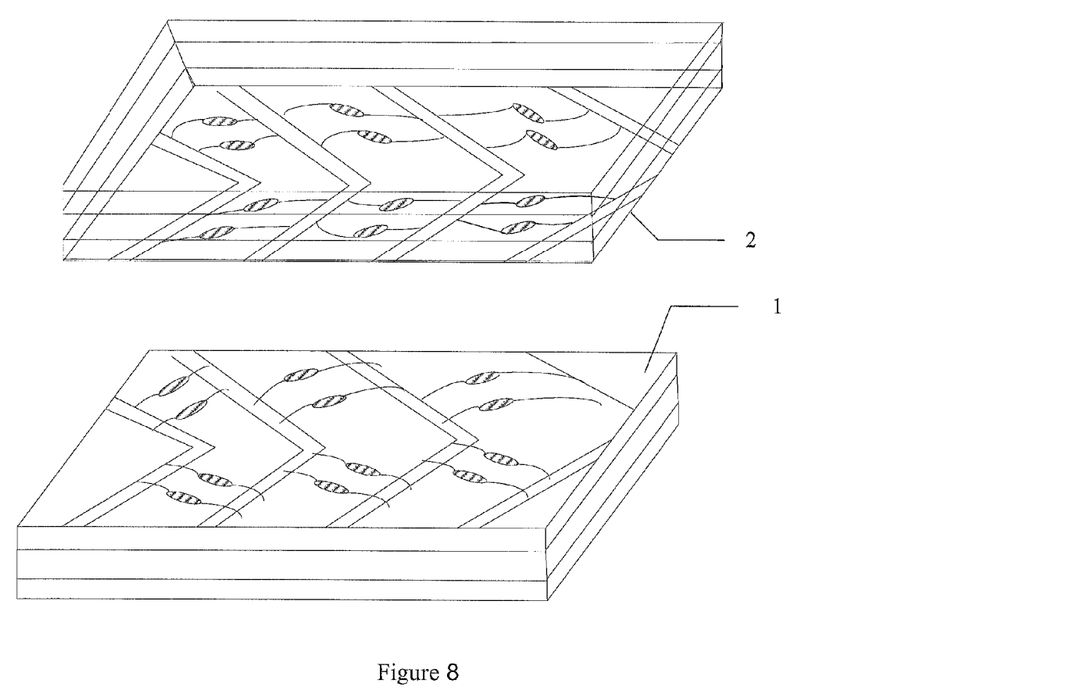
FIG. 8 is a schematic top view of the array substrate having a multi-domain horizontally aligned liquid crystal layer and a color filter substrate according to an embodiment of the present invention, wherein an alignment direction of liquid crystal molecules formed on the color filter substrate is anti-parallel with that of liquid crystal molecules in the multi-domain horizontally aligned layer on the array substrate.

For example, in the embodiment of the present invention, before the step S105 is performed, on the one hand, the alignment film is formed on the color filter substrate manufactured in step S101 of which the alignment direction is vertical to the plane of the array substrate so as to form the liquid crystal display panel in the transparent display device referred in the embodiment 2. On the other hand, the multi-domain horizontally aligned liquid crystal layer is formed on the color filter substrate manufactured in step S101 which includes liquid crystal molecules having an alignment direction anti-paralleled to that of the liquid crystal molecules in multi-domain horizontally aligned layer of the array substrate, and domain directions of the multi-domain horizontally aligned liquid crystal layer on the color filter substrate is the same as those of the multi-domain horizontally aligned liquid crystal layer on the array substrate, that is, the multi-domain horizontally aligned liquid crystal layer formed on the color filter substrate has same number of domains and anti-paralleled alignment direction with the multi-domain horizontally aligned liquid crystal layer formed on the array substrate, as shown in FIG. 8. After the step S105 is performed, a first polarizer and a second polarizer are respectively disposed on the sides of the color filter substrate and the array substrate facing away from the liquid crystal cell, so that the first polarizer and the second polarizer are vertical to each other to form the liquid crystal display panel of the transparent display device referred in the embodiment 3.

The embodiments of the present inventions do not limit the ways of forming the multi-domain horizontally aligned liquid crystal layer on a side of the color filter substrate which has same number of domains and anti-paralleled alignment direction to the multi-domain horizontally aligned liquid crystal layer on the array substrate, a plurality of ways can be used. For example, an identical electrode hierarchical structure can be disposed both on the side of the color filter substrate and the array substrate, and a voltage is applied to the color filter substrate so that the liquid crystal molecules of the polymerable liquid crystal mixtures are aligned in multi-domain to form a finally required multi-domain horizontally aligned liquid crystal layer.

It should be noted that order of the steps of preparing the color filter substrate having a vertical alignment film or a multi-domain horizontally aligned liquid crystal layer and the array substrate having a multi-domain horizontally aligned liquid crystal layer is not specified.

In the method of manufacturing a liquid crystal display panel according to embodiment of the present invention, the polymerable liquid crystal mixture is formed on the array substrate, and the polymerable liquid crystal molecules are arranged in multi-domain according to directions of the electrodes by applying an external voltage so as to form a multi-domain horizontally aligned liquid crystal layer. In such a way, the multi-domain alignment is achieved by a single alignment process, and a vertical alignment film or a multi-domain horizontally aligned liquid crystal layer is disposed on the color filter substrate, and a transparent state and an opaque state of the transparent display device are achieved based on a single alignment process, which simplifies the manufacturing process and is operable, and bad quality of display caused by bad process is avoided.

Embodiment 5

The embodiment 5 of the present invention further provides a liquid crystal display device. The display device includes the liquid crystal display panel referred in the embodiments 1-3 and other structures, wherein other structures are same with conventional structures, so it is not described in detail herein.

In the liquid crystal display device provided by the embodiments of the present invention, a multi-domain horizontally aligned liquid crystal layer is disposed on the side of the array substrate facing the color filter substrate. The liquid crystal molecules of multi-domain horizontally aligned liquid crystal layer are aligned in multi-domain according to domain directions of the electrodes on the array substrate. The multi-domain alignment of the liquid crystal molecules is achieved by a single alignment process, which simplifies the manufacturing process and is operable.

In a liquid crystal display panel and the manufacturing method thereof and a liquid crystal display device according to the embodiments of the present invention, the multi-domain horizontally aligned liquid crystal layer including a polymerable liquid crystal mixture is disposed on the array substrate. The liquid crystal molecules of the multi-domain horizontally aligned liquid crystal layer can be aligned in multi-domain according to domain directions of the multi-domain electrodes on the array substrate under the effect of the electrical field. The multi-domain alignment is achieved by a single alignment process, which simplifies the manufacturing process and is operable, and the bad quality of display caused by bad process is avoided.

It is understood that the described above are only illustrative embodiments and implementations for explaining the principle of the present invention, and the present invention is not intended to be limited thereto. For one of ordinary skill in the art, various modifications and improvements may be made without departing from the spirit and scope of embodiments of the present invention, and all of which shall fall within the protection scope of the present invention.

What is claimed is:

1. A liquid crystal display panel with multi-domain horizontally aligned liquid crystal layer, comprising:
   an array substrate;
   a color filter substrate; and
   a liquid crystal cell formed by assembling the array substrate and the color filter substrate, the liquid crystal cell being filled with liquid crystal;
   wherein a multi-domain alignment electrode structure is disposed on the array substrate, and a multi-domain horizontally aligned liquid crystal layer including a polymerable liquid crystal mixture is disposed on a side of the array substrate facing the color filter substrate, and liquid crystal molecules of the multi-domain horizontally aligned liquid crystal layer are horizontally aligned in multi domains on a plane of the array substrate according to domain directions of electrodes included in the electrode structure on the array substrate.

2. The liquid crystal display panel according to claim 1, wherein an alignment film is disposed on a side of the color filter substrate facing the array substrate, and wherein the alignment film is a vertical alignment film.

3. The liquid crystal display panel according to claim 1, wherein a multi-domain horizontally aligned liquid crystal layer is disposed on the side of the color filter substrate facing the array substrate, and includes liquid crystal molecules having an alignment direction anti-paralleled to that of the liquid crystal molecules in the multi-domain horizontally aligned layer on the array substrate, and domain directions of the multi-domain horizontally aligned liquid crystal layer on the color filter substrate is the same as those of the multi-domain horizontally aligned liquid crystal layer on the array substrate; a first polarizer is disposed on a side of the color filter substrate facing away from the liquid crystal cell; and a second polarizer is disposed on a side of the array substrate facing away from the liquid crystal cell; and wherein the first polarizer and the second polarizer are vertical to each other.

4. The liquid crystal display panel according to claim 1, wherein the polymerable liquid crystal mixture comprise polymerable liquid crystal molecules and reactive groups.

5. The liquid crystal display panel according to claim 4, wherein a ratio of mass percentage for the polymerable liquid crystal molecules to the reactive groups is (90±5)%: (10±5) %.

6. A method of manufacturing a liquid crystal display panel with multi-domain horizontally aligned liquid crystal layer, comprising:
   providing an array substrate having a multi-domain alignment electrode structure;
   providing a color filter substrate; disposing dispersedly polymerable liquid crystal mixture on an inner side of the array substrate;
   applying a voltage to the array substrate so that liquid crystal molecules of the polymerable liquid crystal mixture are horizontally aligned in multi domains on a plane of the array substrate according to domain directions of electrodes under effect of an electrical field;
   curing the polymerable liquid crystal mixture with liquid crystal molecules being horizontally aligned in multi domains so as to form a multi-domain horizontally aligned liquid crystal layer including the polymerable liquid crystal mixture; and
   assembling the color filter substrate and the array substrate having a multi-domain horizontally aligned liquid crystal layer to form a cell and filling liquid crystal to the cell to form a liquid crystal display panel.

7. The method according to claim 6, further comprising: before assembling the color filter substrate and the array substrate with the multi-domain horizontally aligned liquid crystal layer, forming a vertically aligned alignment film on an inner side of the color filter substrate.

8. The method according to claim 6, further comprising: before assembling the color filter substrate and the array substrate with the multi-domain horizontally aligned liquid crystal layer to form a liquid crystal cell, forming a multi-domain horizontally aligned liquid crystal layer, on an inner side of the color filter substrate, which includes liquid crystal molecules having an alignment direction anti-paralleled to that of the liquid crystal molecules in multi-domain horizontally aligned layer of the array substrate; and after assembling the color filter substrate and the array substrate having the multi-domain horizontally aligned liquid crystal layer, a first polarizer and a second polarizer are respectively disposed on sides of the color filter substrate and the array substrate facing away from the liquid crystal cell so that the first polarizer has a polarization direction vertical to that of the second polarizer.

9. The method according to claim 7, wherein the polymerable liquid crystal mixture comprises polymerable liquid crystal molecules and reactive groups, disposing dispersedly the polymerable liquid crystal mixture on the inner side of the array substrate comprises:

controlling a ratio of mass percentage of the polymerable liquid crystal molecules to the reactive groups to be (90±5)%: (10±5)%, and forming the polymerable liquid crystal mixture comprising the polymerable liquid crystal molecules and the reactive groups.

10. A liquid crystal display device, comprising the liquid crystal display panel with multi-domain horizontally aligned liquid crystal layer according to claim 1.

11. The liquid crystal display panel according to claim 2, wherein a multi-domain horizontally aligned liquid crystal layer is disposed on the side of the color filter substrate facing the array substrate, and includes liquid crystal molecules having an alignment direction anti-paralleled to that of the liquid crystal molecules in the multi-domain horizontally aligned layer on the array substrate, and domain directions of the multi-domain horizontally aligned liquid crystal layer on the color filter substrate is the same as those of the multi-domain horizontally aligned liquid crystal layer on the array substrate; a first polarizer is disposed on a side of the color filter substrate facing away from the liquid crystal cell; and a second polarizer is disposed on a side of the array substrate facing away from the liquid crystal cell; and wherein the first polarizer and the second polarizer are vertical to each other.

12. The liquid crystal display panel according to claim 2, wherein the polymerable liquid crystal mixture comprise polymerable liquid crystal molecules and reactive groups.

13. The liquid crystal display panel according to claim 3, wherein the polymerable liquid crystal mixture comprise polymerable liquid crystal molecules and reactive groups.

14. The liquid crystal display panel according to claim 11, wherein the polymerable liquid crystal mixture comprise polymerable liquid crystal molecules and reactive groups.

15. The liquid crystal display panel according to claim 14, where a ratio of mass percentage for the polymerable liquid crystal molecules to the reactive groups is (90±5)%: (10±5)%.

16. The method according to claim 8, wherein the polymerable liquid crystal mixture comprises polymerable liquid crystal molecules and reactive groups, disposing dispersedly the polymerable liquid crystal mixture on the inner side of the array substrate comprises:

controlling a ratio of mass percentage of the polymerable liquid crystal molecules to the reactive groups to be (90±5)%: (10±5)%, and forming the polymerable liquid crystal mixture comprising the polymerable liquid crystal molecules and the reactive groups.

17. The method according to claim 6, wherein the polymerable liquid crystal mixture comprises polymerable liquid crystal molecules and reactive groups, disposing dispersedly the polymerable liquid crystal mixture on the inner side of the array substrate comprises:

controlling a ratio of mass percentage of the polymerable liquid crystal molecules to the reactive groups to be (90±5)%: (10±5)%, and forming the polymerable liquid crystal mixture comprising the polymerable liquid crystal molecules and the reactive groups.

* * * * *